United States Patent Office 3,267,344
Patented August 16, 1966

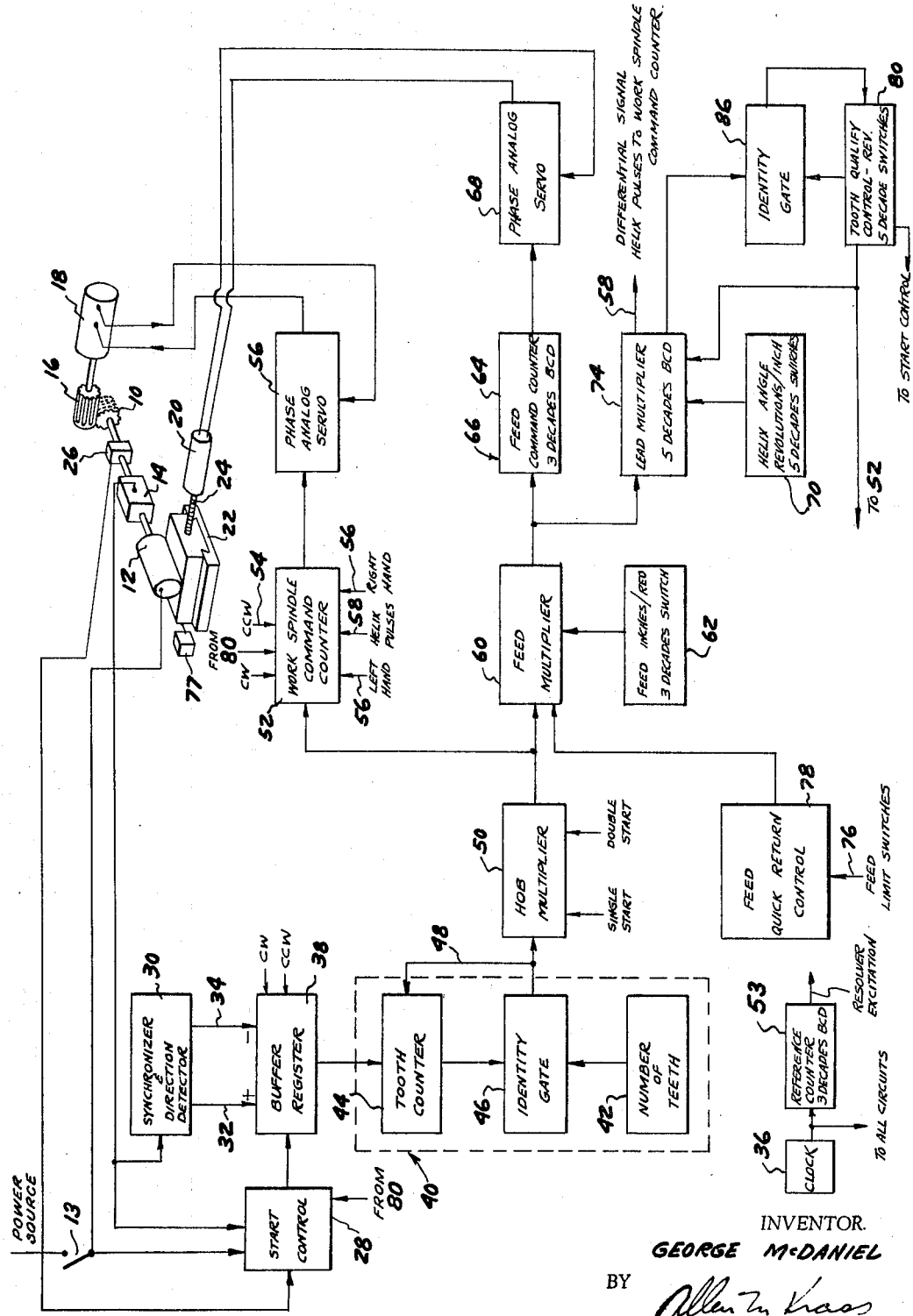

3,267,344
NUMERICALLY CONTROLLED WORK AND FEED MOTOR DRIVEN GEAR-HOBBER
George McDaniel, Northville, Mich., assignor to The Bendix Corporation, Detroit, Mich., a corporation of Delaware
Filed Feb. 4, 1963, Ser. No. 255,808
4 Claims. (Cl. 318—39)

This invention relates to a machine for hobbing gears which operates under the control of numerical information relating to the type of gear to be formed, and more particularly to an electronic control system which directs the movement of the various mechanical elements of the hobber in accordance with the numerical information input.

In a common gear hobber the cutting tool, or hob, is rotated about one axis and the work is rotated about an axis inclined to that of the hob. The work spindle must be rotated in proper synchronism with the hob as the ratio between their rotations determines the number of teeth on the gear and their spacing. Either the work spindle or the hob must also be moved along the work spindle axis. To produce helical gears, it is necessary to synchronize the linear motion within the work spindle rotation, and to vary the normal ratio of rotation between the hob and the work spindle. This is termed a differential motion.

In previous hobbers the work spindle was caused to rotate and the hob caused to feed in timed relation to the rotation of the hob by means of gear trains connecting the hob, work spindle, and feed motion. In order to set up the hobbler for the production of a particular gear it was necessary to change each of the trains.

It is a broad object of the present invention to provide a hobber in which one rotational axis is driven independently by a motor and the rotation of the other axis and the feed are powered by a digital control system on the basis of numerical information provided to the system.

While in the preferred embodiment described subsequently, the hob is rotated independently and the hob feed and the work spindle rotation are made dependent thereon, it would be possible to make either the spindle rotation or feed the independent motion, and to control the other two in synchronism with it.

While only two variables, the rotation of the work spindle and feed of the hob are controlled by the system of the preferred embodiment, it has provision for the input of four numerical quantities as well as several sign quantities relating to the direction of rotation of the hob and work and the hob type. In addition to the number of teeth, which basically relates hob rotation to spindle rotation, and the feed in inches per revolution of the work spindle, the numerical quantities are the nature of the hob type, either single-start or double-start, and the helix angle in revolutions per inch of feed. It would be possible to construct a system in accordance with the broad inventive concepts which combined the signals relating to the number of teeth, hop type and helix angle into a single numerical quantity. However, such a system would present the same disadvantages which caused the differential feed hobber to replace previous types.

In the present invention the rotation and feed are controlled by "digital servo mechanisms." By a digital servo mechanism I mean one which has as its input a train of electrical pulses of relatively fixed magnitude and duration. Such a servo controls its motor so as to move the output through a distance directly proportional to the number of pulses received at a rate which is a function of the pulse rate of the train. Such a servo system is disclosed in U.S. Patents No. 3,011,110 issued November 28, 1961, to Ho et al. and 2,537,427 issued January 9, 1951 to Said et al.

In the preferred embodiment of the invention, which will subsequenty be described in detail, the hob is rotated by conventional means and a pulse generator mechanically connected to the hob driveshaft generates pulses for each small angle of revolution of the hob. Appropriate electronic circuitry utilizes this pulse output to determine direction of rotation of the hob and provides output to one of two lines, depending upon that direction. Additional circuitry eliminates from this train those pulses which occur from vibration of the hob and do not represent continuous rotational movement. The resultant pulse train is fed to a divider which has as its other informational output decade switches appropriately set to the number of teeth to be formed on the gear. The number of teeth also may be characterized as the ratio between rotation of the hob and rotation of the work spindle, since for a single-start hob the hob must rotate a number of times equal to the number of teeth to be formed for each single rotation of the work spindle. The output of the divider is therefore a pulse train having a number of pulses equal to the input train divided by the number of teeth to be formed.

This train passes through a pulse multiplier which is capable of doubling the number of pulses in the train when a double-start hob is implied. This feature can be extended to cover any multiple hob.

This output pulse train is used in two places. First, it directly drives the digital servo which powers the rotation of the work spindle. Second, the output pulse train from the hob multiplier is fed to a feed multiplier having as its other input a series of decade switches carrying information relating the required feed in unit distance per revolution of the work spindle. Since the input information represents a fractional quantity the output of this multiplier is a pulse train containing fewer pulses than the input train.

These pulses drive a digital servo which powers the axial feed of the hob. They also go to a second multiplier which has input switches relating to a desired differential feed motion in revolutions per inch if a helical gear is being formed. The output of this multiplier also contains fewer pulses than the input train. It is added to the pulse train which controls the work spindle rotation so as to provide a differential action in the rotation of the work spindle.

The preferred embodiment also incorporates features for causing quick return of the work spindle feed when the part is completed and means for correlating the start of the rotation of the hob with motions of the work spindle.

It is therefore seen to be an object of the present invention to provide a system capable of rotating a first part and simultaneously rotating and feeding a second part in timed relation to the rotation of the first part in accordance with data introduced to the system in numerical form.

It is a further object to provide a hobber in which the work spindle rotation and hob feed are powered by digital servos operating upon pulse trains provided by multipliers and/or dividers which operate on numerical information and pulses provided from the rotation of an independently powered hob.

Other objects, advantages and applications of the present invention will be made apparent from the following detailed description of the preferred embodiment of the invention. The description makes reference to the accompanying drawing which represents a block diagram of the electronics of the system and a schematic sketch of the mechanical elements.

As is shown schematically in the drawing, the preferred embodiment of the present invention operates in conjunction with a machine wherein a hob 10 is rotated by an appropriate drive motor 12. The motor 12 is energized when a start switch 13 connects the motor to an appropriate power source. The motor 12 may be of any type commonly employed with hobbers and its speed may be adjusted in accordance with common cutter practice. A quantizer 14 is associated with the shaft of the drive motor 12 and connected thereto by appropriate gearing so as to provide output pulses at each small incremental rotation of the motor shaft. This quantizer may be of the type disclosed in U.S. Patent No. 3,069,608, issued Dec. 18, 1962 to Forrester et al. wherein two sets of pulses are produced upon rotation of the shaft and the phase relation between the two resultant pulse trains may be analyzed to determine the direction of rotation of the motor. The quantizer also produces an identification pulse once each rotation.

A work spindle 16 is supported for rotation about an axis which may be generally inclined to that of the hob 10. The work spindle 16 is schematically disclosed as being rotated by a motor 18. The hob motor 12 is supported on ways 22 which extend parallel to the work spindle axis and driven along the ways by a screw 24 connected to the shaft of the motor 20. The position of the hob drive on the ways 22 is adjustable to vary the angle of inclination between the hob and work.

In practice, the hob drive motor 12 is independently rotated and pulses produced by the quantizer 14 are used to control the operation of the motors 18 and 20 in accordance with numerical data entered into the system, by appropriate means to be described subsequently. The rotation of the work spindle 16 is controlled by the motor 18 and the feed of the hob is controlled by the motor 20. Both the rotation and feed must occur in timed relation to the rotation of the hob 10 in order to produce a gear in accordance with the numerical information.

A cam driven limit switch 26 is also disposed on the shaft of the hob 10 and is operative to produce an electrical signal when the shaft of the hob 10 is in a unique position.

The outputs of both the quantizer 14 and of the limit switch 26 are fed to an electronic circuit 28 which controls the start of operation of the circuitry. After an appropriate start switch (not shown) is actuated the hob motor 12 begins to rotate and the control 28 transmits a starting signal to the subsequent circuitry upon the simultaneous occurrence of the signal from the limit switch 26 and an identification pulse from the quantizer 14. Since the quantizer 14 is geared to the motor 12 so as to rotate a number of times for each rotation of the motor's shaft this procedure insures that the shaft of the motor 12 is in its unique starting position. This unique position may be arbitrarily selected and it is utilized to insure that the machine will have a uniform response to a given input program so that it may duplicate its performance at a later time. To do this, it is necessary that the hob have a unique position with respect to the driving motor.

Pulses from the quantizer 14 are also fed to a synchronizer and direction detector circuit 30. This electronic unit determines the direction of rotation of the hob drive motor 12 on the basis of the phase relationship of the two trains of pulses transmitted to it, and produces an output train of pulses on one of a pair of lines 32 or 34 depending upon the determined direction of rotation. These output pulses are in synchronism with pulses produced by a clock 36. The clock 36 constitutes a free running multi-vibrator which synchronizes the operation of all electronic circuits in a manner well known to those skilled in the digital control and computer arts. It may do this by providing a conditioning input to both the set and reset side of all of the flip-flops utilized in the controlled circuitry. In other embodiments of the invention the circuitry might be run on an asynchronous basis from the pulses developed by the quantizer 14.

The two lines 32 and 34 connect to a buffer counter 38 which is used to insure that the number of spindle pulses that are transmitted to the subsequent circuitry is truly proportional to the net motion of the spindle in the desired direction. When the spindle is rotating in a particular direction, something may occur in the operation of the machine to cause the spindle to back up. For example, if the spindle is moving in a positive direction and an excessive load is placed upon the spindle, the spindle may vibrate so as to reverse its direction momentarily because of this load. When this occurs, the spindle will back up one or more spindle pulse positions. Once the load is overcome, the spindle will resume its rotation in the positive direction. If the spindle had backed up one pulse position, the spindle will again rotate through this position and a positive direction will thus produce an extra spindle pulse. The buffer register 38 functions to prevent this extra pulse from getting to the subsequent circuitry.

The buffer register 38 in essence comprises a reversible counter. The counter operates to provide pulses to its output only when the count is zero. Assuming that pulses are being transmitted from the synchronizer positive line 32 and the count zero, the buffer 38 will provide these pulses to its output line. If for some reason the pulse occurs on the negative line 34 indicating some quantizer rotation in the wrong direction, the buffer register will count to negative one. The next pulse on the positive channel will not be gated through, but will count the buffer counter back to zero. Therefore, the pulses gated through the buffer counter give a correct indication of the cumulative hobber rotation.

The synchronizer 30 and buffer counter 38 can be formed by anyone skilled in the digital electronic art. A synchronizer of the type employed is described in U.S. patent application No. 752,686, filed July 31, 1958, in FIGURE 13. The same application discloses circuitry for a buffer register on page 72.

The pulses from the buffer register 38 are fed to a pulse divider comprising a number of electronic circuits generally denominated 40 in the drawing. The subsequent circuitry employs several other units which will be termed pulse multipliers. As used herein, both pulse multipliers and dividers have as their inputs pulse trains and numerical information, and provide as their output pulse trains. The unit will be termed a multiplier if the number of pulses in the output train increases as the numerical information becomes larger, and conversely will be termed a divider if the number of pulses in the output train decreases as the numerical information employed becomes larger. In general, multipliers or dividers may be substituted for one another at any point in the present system and when such a change is made the input numerical information required will be similarly modified. Multipliers and dividers will be generically termed "operators" in the appended claims.

The numerical information for the divider 40 is provided on a series of three decades of binary coded decimal switches which are contained in the unit 42. The information introduced into the unit 42 constitutes the number of teeth on the gear to be formed. The hob must rotate through a number of turns equal to the number of teeth to be formed for each single rotation of the work spindle. This number will normally contain a maximum of three decimal digits and four switches are provided for each one of the digits so that it may be presented in an 8421 code.

The pulses from the buffer register 38 are fed to a tooth counter 44 which also has three decades of binary coded decimal stages. The switches 42 and the counter 44 are both connected to a identity gate 46 which compares their counts and gates an output pulse when the counts are equal. At the same time the identity gate 46 transmits a signal to the tooth counter on line 48, which causes the counter to be reset to zero. Thus, if the switches 42 are set to the number 025, the identity gate emits one pulse on its output line for every 25 pulses received from the binary register 38. It thus divides the pulse trains received from the register 38 by the numerical quantity set in the switches 42.

The output of the identity gate 46 feeds to a hob-type multiplier 50. The multiplier 50 acts to double its number of output pulses if a double-start hob is employed with the machine. When such a hob is used the effective ratio between the rotation of the work spindle and the rotation of the hob must be doubled. This is done by doubling the output pulses. The unit 50 therefore has an informational input in the form of a manually actuable switch which is thrown only if a double hob is employed. The multiplier 50 simply gates two clock pulses for each input pulse if this occurs.

The output of the hob multiplier is fed to a work spindle command counter 52. This unit is of the type described in U.S. patent application No. 3,011,110 issued November 28, 1961 to Ho et al. It operates in conjunction with the reference counter 53 to provide command and reference sine waves to a phase analog servo unit 56. Broadly the command counter 52 has input from the output of the reference counter 53 and acts to advance or retard the square wave output of the counter by a definite phase angle for each pulse input it receives, depending upon the sign of the input. The command counter 52 has a set of inputs 54 which indicates the desired direction of rotation of the work spindle. This information is provided from two position switches. Similarly, it has a pair of inputs 56 which indicates the nature of the hob being used, whether left-hand or right-hand. Both of these inputs 54 and 56 conditions the inputs to the command counter so as to determine whether a particular pulse input advances or retards the phase of the output square wave. Additionally an input 58 provides additional pulses which may be added or subtracted from the input pulses from the hob multiplier 50 in order to cut a right or left-hand helical gear. The manner of generation of these pulses will be subsequently described.

The phase analog servo 56 provides output to the work spindle rotational motor 18 and receives feed-back signals from a resolver which is either integral with the motor 18 or is mechanically coupled thereto. In the absence of pulses on the line 58 the phase analog servo 56 therefore controls the rotation of the motor 18 in accordance with the information introduced in the switches 42 as it may be modified by the hob multiplier 50. Preferably, each unit of advance or retardation of the square wave accomplished in the command counter represents the same increment of motion which provides a pulse from the quantizer 14. Therefore the number of teeth introduced into the switches 42 may represent the direct ratio between the hob rotation and the work spindle rotation.

The pulses from the hob multiplier 50 are also introduced to a feed multiplier 60. In addition to the train, the feed multiplier 60 has an information input from a series of decade switches 62 set to the feed in inches per revolution of the work spindle. The switches 62 are preferably arranged in three banks, each representing one decade in the 5211 representation. The muliplier 60 contains a three decade binary coded decimal counter (8421 code) and a series of gates. As the work spindle command pulses from the hob multiplier 50 are entered into the feed multiplier they advance the stages of the counter. The non-carry pulses of each stage of the counter are gated by signals from the feed numbers switch 62. The particular arrangement of codes allows the non-carry pulses from the counter to be directly gated. The output of the feed multiplier 60 represents a train of pulses, spaced at roughly regular intervals with respect to one another containing a number of pulses proportional to the number of input pulses multiplied by the decimal quantity represented by the feed switches 62.

These pulses are fed to the feed command counter 64 which also has an informational input 66 controlling the direction of the feed by determining whether input pulses advance or retard the phase of the square wave. The output of the command counter is to a phase analog servo 68 which has input and feed-back connections to the feed motor 20.

As the feed multiplier operates on feed command pulses the ratio introduced in the feed switches 62 directly controls the feed distance on the basis of the revolutions of the work spindle.

In order to produce a helical gear it is necessary to advance or retard the normal rotation of the work spindle beyond the ratio with the hob rotation necessary to produce a spur gear. This change is a function of the work spindle feed and the helix angle. The helix angle may be expressed in inches per revolution of the spindle. The amount of differential work spindle rotation is equal to the feed in inches divided by the helix lead in inches per revolution. In the preferred embodiment a multiplier is employed to develop the differential signal rather than a divider so the helix quantity is expressed as the reciprocal of the helix lead in revolutions per inch. This quantity is introduced into lead switches 70 again arranged in a 5211 binary coded decimal array. The lead multiplier 74 receives the feed command pulses from the multiplier 60 as well as the output of the switches 70. It includes a 5 decade binary coded decimal counter arranged in an 8421 code. The non-carry pulses from the counter are gated out under the control of the switches 70 and are provided to the input 58 of the work spindle command counter. Here they are added to the command pulses received from the hob multiplier 50 so as to sum the normal work spindle rotation and the differential motion.

When a workpiece is completed, limit switches (not shown) which are normally associated with hobbers provide a signal on line 76 to a feed quick return control 78. This directs pulses to the feed multiplier 60 at a rate such as to cause a rapid return of the feed motor 20. Similar means are employed to return the work spindle rotational motor 18 to its reference position.

When it is necessary to correlate the position of the gear teeth with respect to some reference point on the work, the necessary rotation of the work spindle to bring the work into proper position with respect to the hob is introduced in decade switches 80. The decade switches 80 provide for five decades of 8421 B. C. D. information. When the start control switches 28 are actuated, pulses will not be gated from the buffer register 38 to the tooth counter, but rather clock pulses will be gated into the lead multiplier counter 74 which is initially clear, and also into the work spindle command counter 52. An identity gate 86 senses the count in the lead multiplier 74 and compares it to the number set in the decade switches 80. When an identity is reached the pulses to the units 74 and 60 are terminated and the lead multiplier counter is cleaned. Then, as soon as a pulse is received from limit switch 26 and an identification pulse from the quantizer 14 indicating that the hob is in its zero position, pulses are admitted to the tooth counter initiating operation of the system.

Having thus described my invention, I claim:

1. A control system for a machine having a first rotatable spindle, a second rotatable spindle, and means for feeding said first spindle, wherein the feed of said first spindle must bear an integral numerical relation to the rotation of the second spindle, comprising: a motor connected to said first spindle; an independent power system for said motor; a transducer connected to said first spindle and operative to generate an electrical pulse for each predetermined incremental motion of the first spindle; a digital operator connected to receive the pulse train constituting the output of the transducer and a numerical quantity and to provide as an output a pulse train having a number of pulses fewer than the input train, the number of pulses in said output train being a factor of both the number of pulses in the input train and the numerical quantity; a digital servo system having said second pulse train as its input, operatively connected to the second spindle so as to rotate it through a distance proportional to the number of pulses in said second train at a rate proportional to the instantaneous pulse rate in said second train; a second operator having said second pulse train and a second numerical quantity expressing said integral numerical relationship between the rotation of the second spindle and the feed of the first spindle as its inputs and being operative to provide as an output a third pulse train having fewer pulses than said second pulse train, the number of pulses in said third train being a function of the number of pulses in said second train and said second numerical quantity; and a second digital servo system operative to receive said third pulse train and drivingly connected to said means for feeding the first spindle, whereby the feed of the first spindle bears said integral numerical relationship to the rotation of the second spindle as expressed by said second numerical quantity.

2. An electronic control system for a hobber including a first rotatable spindle, a second rotatable spindle, and means for feeding said first spindle, wherein the feed of said first spindle must bear an integral numerical relationship to the rotation of the second spindle, comprising: a motor having an independent power system operative to rotate the first spindle; a transducer operative to provide an output pulse for each incremental rotation of the first spindle; a counter operative to receive the pulses generated by the transducer; a first group of input switches adapted to receive first information relating to the desired ratio between the rotation of the first spindle and the rotation of the second spindle; an identity circuit operative to compare the information contained in the counter and in the first group of switches and to emit an output pulse and return the counter to zero each time an identity occurs between the two quantities; a first servo system operative to receive the pulses emitted by the identity circuit and to control the rotation of the second spindle in accordance with said pulses; a multiplier operative to receive the pulses emitted by the identity circuit and a numerical quantity expressing said integral relationship between the rotation of the second spindle and the feed of the first spindle set in a second group of switches and to provide an output pulse train having a number of pulses which is the function of the number of pulses emitted by the identity circuit and the numerical quantity set in the second group of switches; and a second servo-mechanism operative to receive the pulse output of the multiplier and to control the feed of the first spindle in accordance with the pulses, whereby the feed of the first spindle bears an integral numerical relation to the rotation of the second spindle, as expressed by the numerical quantity set in the second group of switches.

3. An electronic control system, for a machine having three movable parts, a first which is to be moved at an independent rate, a second which is to be moved at a rate which is a function of the rate of movement of the first, and a third which is to be moved at a rate which is an integral numerical function of the rate of movement of the second, comprising: means for independently driving the first part; a transducer operative to generate an electrical pulse for each incremental motion of the first part; a first digital operator operative to receive the pulse train which is the output of the transducer and a numerical quantity and to provide an output pulse train having a number of pulses which is a function of both the numerical quantity and the number of pulses in the transducer pulse train; a first digital servo-mechanism operative to receive a pulse train from said first operator and to move the second part; a second digital operator operative to receive the output pulse train from said first digital operator and a second numerical quantity which expresses said integral numerical relationship and to provide an output pulse train having a number of pulses which is a function of both the second numerical quantity and the number of pulses in said second pulse train; and a second digital servo-mechanism operative to receive the second pulse train and to move the third part, whereby the motion of said third part bears said integral numerical relationship to the motion of the second part as expressed by said second numerical quantity.

4. An electronic control system, for a hobber which includes a rotatable work spindle and a rotatable hob spindle which is movable along an axis parallel to that of the work spindle, and wherein the feed motion of the hob spindle along its axis must bear an integral numerical relationship to the rotation of the work spindle so as to produce an integral lead on the workpiece to be formed comprising: a motor having an independent power system operative to rotate the hob spindle; a transducer operative to provide an output pulse for each incremental rotation of the hob spindle; a counter operative to receive the pulses generated by the transducer; a first group of input limit switches adapted to receive information relating to the number of teeth to be formed on a workpiece; an identity circuit operative to compare the information contained in the counter and the first group of switches and to emit an output pulse and return the counter to zero each time an identity occurs between the two quantities; a first servo system operative to receive the pulses emitted by the identity circuit and to control the rotation of the work spindle in accordance with said pulses; a second group of input switches adapted to receive second information relating to the lead of a helical workpiece to be formed; a multiplier operative to receive the pulses emitted by the identity circuit and the information set in the second group of switches and to provide an output pulse train having a number of pulses which is a function of the number of pulses emitted by the identity circuit in a numerical quantity set in the second group of switches; and a second servo-mechanism operative to receive the pulse output of the multiplier and to control the motion of the hob spindle in accordance with the pulses.

References Cited by the Examiner

UNITED STATES PATENTS

| 2,927,258 | 3/1960 | Lippel | 318—162 X |
|---|---|---|---|
| 2,964,252 | 12/1960 | Rosenberg. | |
| 3,015,806 | 1/1962 | Wang et al. | |
| 3,064,173 | 11/1962 | Breen et al. | 318—85 X |

FOREIGN PATENTS

| 619,088 | 4/1961 | Canada. |
|---|---|---|
| 829,824 | 3/1960 | Great Britain. |
| 837,817 | 6/1960 | Great Britain. |

ORIS L. RADER, *Primary Examiner.*

LEON PEAR, *Examiner.*

L. B. TAYLOR, T. LYNCH, *Assistant Examiners.*